United States Patent

Norteman

[11] 3,910,315
[45] Oct. 7, 1975

[54] ELECTRICAL METALLIC TUBING
[75] Inventor: Samuel L. Norteman, Wheeling, W. Va.
[73] Assignee: Wheeling-Pittsburgh Steel Corporation, Pittsburgh, Pa.
[22] Filed: Apr. 19, 1974
[21] Appl. No.: 462,430

Related U.S. Application Data
[62] Division of Ser. No. 265,607, June 23, 1973, Pat. No. 3,827,139.

[52] U.S. Cl. ............... 138/145; 138/151; 138/171; 138/DIG. 6
[51] Int. Cl.² .................... F16L 9/00; F16L 9/14
[58] Field of Search ........... 138/145, 146, 151, 152, 138/171, DIG. 6

[56] References Cited
UNITED STATES PATENTS

| | | | |
|---|---|---|---|
| 645,187 | 3/1900 | Richmondt | 138/146 |
| 1,441,484 | 1/1923 | Conover | 138/171 |
| 2,303,869 | 12/1942 | Quinian et al. | 117/71 |
| 2,794,448 | 6/1957 | Marantz | 138/145 |
| 2,798,509 | 7/1957 | Bergquist | 138/145 |
| 2,982,312 | 5/1961 | Caplan et al. | 138/145 |
| 3,259,148 | 7/1966 | Krengel et al. | 138/145 |
| 3,827,139 | 8/1974 | Norteman | 29/527.4 |

Primary Examiner—Richard E. Aegerter
Assistant Examiner—Richard R. Stearns
Attorney, Agent, or Firm—Buell, Blenko & Ziesenheim

[57] ABSTRACT

Electrical metallic tubing manufactured from galvanized steel strip by forming the strip into tubular shape and welding the edges together, is provided with a duplex replacement metal coating on the outer surface of the weld area where the zinc is volatilized or melted by the heat of welding or removed by subsequent scarfing. The replacement coating comprises an aluminum coating in contact with the steel surface and a zinc coating superimposed directly on the aluminum coating.

2 Claims, 3 Drawing Figures

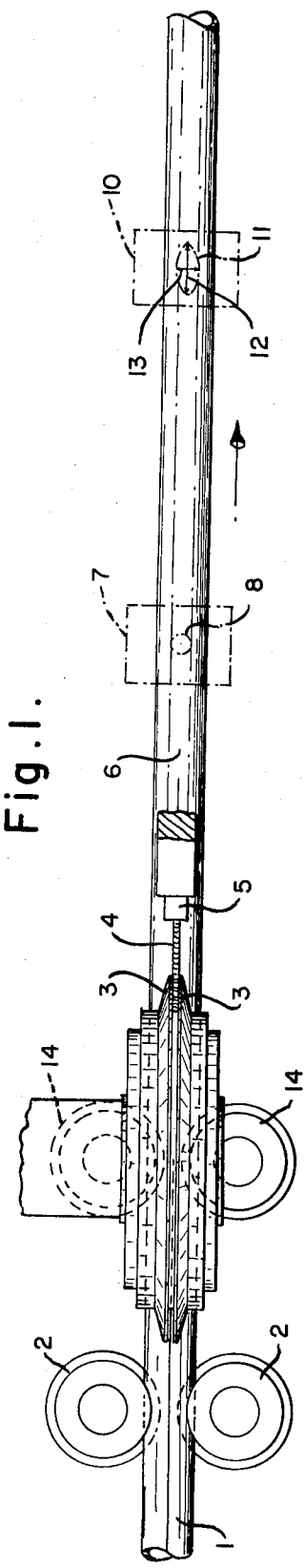
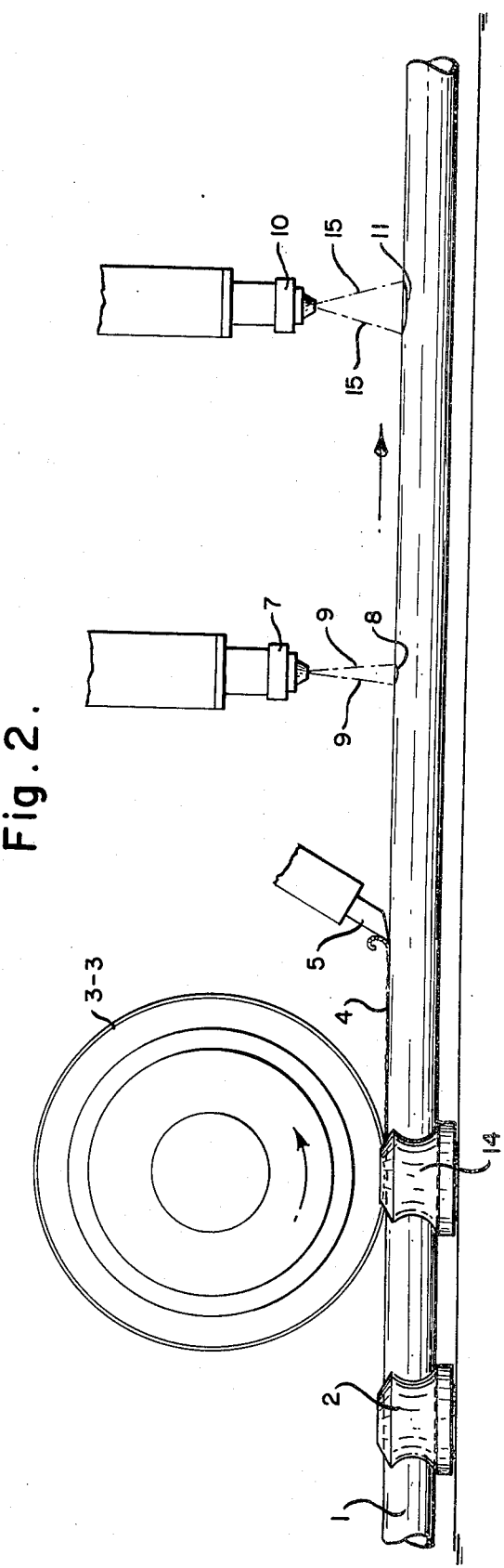

ELECTRICAL METALLIC TUBING

This is a division of application Ser. No. 265,607, now U.S. Pat. No. 3,827,139, filed June 23, 1973.

This invention relates to electrical metallic tubing. It is more particularly concerned with thin-walled zinc coated welded electrical metallic tubing.

Electrical metallic tubing is used for metal raceways for the installation of electrical wires and cables. Large quantities of this tubing are made of steel in size ranges from nominal ⅜ inch to nominal 4 inches diameter. The tubing is relatively thin-walled, having a wall thickness of about 0.042 inch in the smallest sizes and increasing to about 0.083 inch for nominal 4 inches tubing. Steel tubing of this type is conventionally made by forming a flat blank into a tube and welding the edges together. The smaller sizes of electrical metallic tubing are often bent in fabrication and must be able to withstand bending without cracking, rupture or collapse. Tubing of ½ inch nominal or trade size, for example, must be able to withstand bending into a semi-circle the inner edge of which has a radius of 3½ inches.

Steel tubing of this type is commonly protected by a zinc coating. The tubing after forming and welding is conventionally hot dip galvanized or electro-galvanized so that the weld is coated to the same extent as the remainder of the surface. The Underwriters' Laboratories require that the galvanized coating on the exterior of the tubing meet certain thickness standards described hereinafter. These standards do not apply to the coating on the inside of the tube, but that coating must protect the tubing against corrosion. In practice, therefore, the inside surface of the formed tubing is spray or flow coated with an enamel, paint or other acceptable coating.

The coating thickness test specified by the Underwriters' Laboratories is commonly known as the Preece test and is described in detail in the Underwriters' Laboratories standards for electrical metallic tubing, UL 797. Specimens of the zinc coated steel are immersed or dipped in a copper sulfate solution of prescribed strength for sixty seconds and are then removed and washed in running water. The zinc from the specimen displaces copper from the solution, which copper plates out on the specimen. The copper does not adhere strongly to zinc, however, and the loosely adhering deposits are removed by washing in water, followed by wiping the specimen with cheesecloth. The procedure described is then repeated, to an end point described hereinafter. The coating thickness is determined by the number of successive dips which the coating can withstand without dissolving to the steel base. When the zinc is removed down to the iron, which also displaces copper from the solution, the copper adheres firmly to the iron and cannot be washed or rubbed off. The zinc coating of electrical metallic tubing must withstand four such immersions or dips without showing a final firm deposit of copper.

It would be economically advantageous to manufacture electrical metallic tubing with an outside coating of zinc which meets the Underwriters' Laboratories requirements above set out but with an inside coating only thick enough to prevent corrosion, and it is the principal object of my invention to provide such tubing. Other objects of my invention will appear in the course of the description thereof which follows.

I have found that electrical metallic tubing can be formed and welded from galvanized steel strip provided with a relatively heavy coating of zinc on the side which forms the outside of the tubing and with a relatively lighter coating of zinc on the side which forms the inside of the tubing. The zince which is unavoidably melted or volatilized in the weld area by the heat of welding or removed by subsequent scarfing is replaced by gas or arc metallizing in the way hereinafter described. Tubing produced by my process meets all specifications of the Underwriters' Laboratories for electrical metallic tubing.

An arrangement suitable for carrying out my process is schematically illustrated in the attached figures.

FIG. 1 is a plan, and

FIG. 2 is an elevation of apparatus arranged for continuous welding and spray metallizing of tubing.

Figure 3:
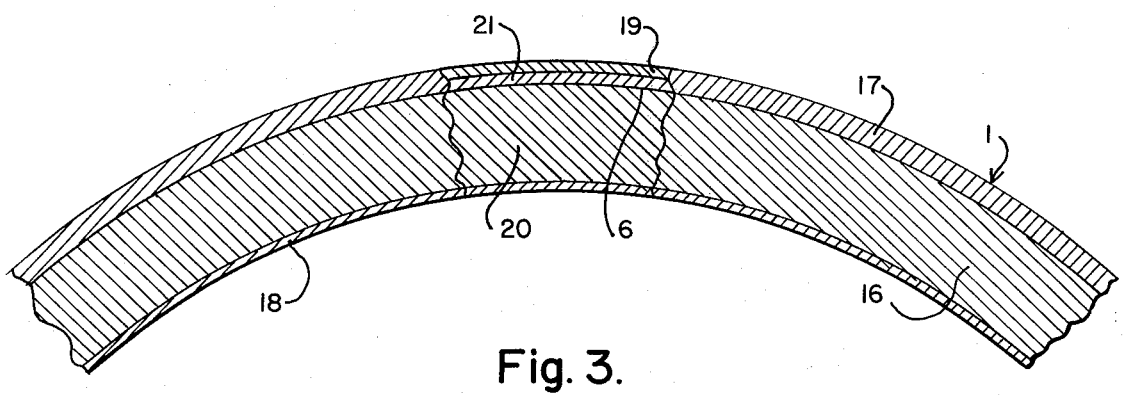
FIG. 3 is a partial cross section of electrical metallic tubing of my invention.

The tube bending apparatus is not shown as it is ancillary to my process. The tubing 1, bent to shape with its edges abutting, passes from left to right in my figures through a pair of contoured rolls 2—2 which force the edges of the tubing together. Immediately downstream of rolls 2—2 the tubing passes under rotary electrodes 3—3 of a rotary welder, each electrode 3 being positioned to make contact with an edge of tubing 1. The edges of the tubing are welded together by passing current through them from the electrodes 3—3 while the edges are held in contact by a second pair of contoured rolls 14—14, and the welded tubing emerges with an outside flash 4 which is continuously removed by scarfing knife 5. The weld also has an inside flash, as has been mentioned, which is ironed or compressed by ironing means not shown.

The tubing 1 after passing under scarfing knife 5 has a narrow welded surface zone 6 from which the original zinc coating has been melted off or volatilized in the welding and which has been scraped clean by scarfer knife 5. Downstream from scarfer knife 5 is positioned aluminum metallizing gun 7 directly above the welded surface zone 6 of the tubing 1 and adjusted to direct a spray of molten aluminum substantially vertically downward onto the tubing 1. The spray pattern of aluminum is circular in plan, as is shown by broken circular line 8, and conical in section, as is shown by broken lines 9—9. The diameter of the spray pattern is approximately the width of weld surface zone 6.

Zinc metallizing gun 10 is positioned downstream of aluminum metallizing gun 7 directly above the weld surface zone 6 of tubing 1 and is adjusted to direct a spray of molten zinc substantially downwardly onto the weld surface zone 6 of tubing 1. The spray pattern of zinc is elliptical in plan, as is shown by the broken elliptical line 11. The major axis 12 of the ellipse is positioned on the weld line and is about three times the length of its minor axis 13. Spray gun 10 is also adjusted so that the minor axis 13 of its spray pattern is approximately the width of weld surface zone 6. The zinc spray pattern is conical in elevation as is shown in broken lines 15—15. This spray pattern is denominated a fan-shaped spray.

In an embodiment of my invention presently preferred by me, I provide steel strip of the desired gauge with a coating of zinc which is thicker on one side of the strip than on the other. This differential coating, so called, is produced either by hot dip galvanizing or by electro-galvanizing by known methods. The strip width required for tubing is relatively narrow compared to the width of strip which can be galvanized in modern strip galvanizing installation, and as it is more economical to galvanize strip in relatively wide width than in narrow width, I prefer to galvanize strip in widths which are multiples of the strip widths required for tubing and then to slit the strip. The continuously welded, scarfed and spray metallized tubing is then continuously straightened and cut into lengths.

As is seen in FIG. 3, the tubing 1 comprises a formed steel base strip 16, the longitudinal edges of which are welded together in an area or zone 20. The base 16 has an outer coating of zinc 17 which is continuous except at the surface 6 of the weld zone 20 and an inner coating of zinc 18 which is thinner than outer coating 17. In contact with the steel base 16 over the surface 6 of the weld area 20 and covering that surface is a coating of aluminum 21, and superimposed thereon is a coating of zinc 19 which covers the aluminum coating 21. The aluminum coating 21 and zinc coating 19 superimposed thereon are limited in width to the width of the surface 6 of the weld area 20 and extend along the tubing as narrow ribbons replacing in the aggregate the original zinc coating destroyed in the tube welding operation.

Although I have described and illustrated my process as carried out with resistance welded tubing it is equally applicable to tubing produced by high frequency induction welding.

In the foregoing specification I have described a presently preferred embodiment of this invention, however, it will be understood that this invention can be otherwise embodied within the scope of the following claims.

I claim:

1. Electrical metallic tubing comprising welded steel tubing having an outer coating of zinc in contact with the steel tubing except over the outer surface of the weld area and over that surface only an aluminum coating in contact with the steel tubing and a zinc coating superimposed directly on the aluminum coating.

2. Electrical metallic tubing of claim 1, including an inner coating of zinc thinner than said outer zinc coating.

* * * * *